US008229868B2

(12) United States Patent
Nakamura et al.

(10) Patent No.: US 8,229,868 B2
(45) Date of Patent: Jul. 24, 2012

(54) DATA CONVERTING APPARATUS AND MEDIUM HAVING DATA CONVERTING PROGRAM

(75) Inventors: Yoshiki Nakamura, Yokohama (JP); Hiroshi Furuya, Yokohama (JP)

(73) Assignee: Tokyo Institute of Technology, Tokyo (JP)

( * ) Notice: Subject to any disclaimer, the term of this patent is extended or adjusted under 35 U.S.C. 154(b) by 672 days.

(21) Appl. No.: 12/422,558

(22) Filed: Apr. 13, 2009

(65) Prior Publication Data

US 2010/0262569 A1  Oct. 14, 2010

(51) Int. Cl.
*G06F 15/18* (2006.01)

(52) U.S. Cl. .......................................... 706/14

(58) Field of Classification Search ............... 706/14; 345/589, 595; 382/275, 302
See application file for complete search history.

(56) References Cited

U.S. PATENT DOCUMENTS

| | | | |
|---|---|---|---|
| 2003/0161406 A1* | 8/2003 | Lee | 375/240.19 |
| 2005/0212930 A1* | 9/2005 | Sim et al. | 348/231.4 |
| 2005/0219068 A1* | 10/2005 | Jones et al. | 341/50 |
| 2007/0263938 A1* | 11/2007 | Lee et al. | 382/240 |
| 2008/0037892 A1 | 2/2008 | Nakamura et al. | |
| 2009/0060027 A1* | 3/2009 | Ferguson | 375/240.01 |
| 2010/0215264 A1* | 8/2010 | Nakamura | 382/167 |

FOREIGN PATENT DOCUMENTS

JP  2004-061150 A  2/2004

OTHER PUBLICATIONS

Gu, J. "3D Wavelet-Based Video Codec with Human Perceptual Model", Masters Thesis, University of Maryland at College Park, Center for Satellite and Hybrid Communication Networks, CSHCN M.S. 99-3 (ISR M.S. 99-3). 1999. 83 pages.*

* cited by examiner

*Primary Examiner* — Jeffrey A Gaffin
*Assistant Examiner* — Benjamin Buss
(74) *Attorney, Agent, or Firm* — Arent Fox LLP

(57) ABSTRACT

A data converting apparatus and a data converting program are suitable to quantitatively estimate, based on a temporal alteration of a stimulus value, a temporal alteration of a sensitivity brought to human beings. The data converting apparatus includes a decomposing unit subjecting temporal alteration data of a stimulus value to wavelet decomposition to extract plural time-frequency components contained in the temporal alteration data, a weighting unit weighting the plural extracted time-frequency components weighting coefficients which are predetermined based on a relationship between a temporal alteration of a stimulus value and a temporal alteration of a sensitivity of human beings to the stimulus value, and a synthesizing unit subjecting the plural weighted time-frequency components to wavelet synthesis to estimate a sensitivity brought to human beings when the stimulus value is subjected to temporal alteration according to the temporal alteration data.

20 Claims, 13 Drawing Sheets

10 (DATA CONVERTING APPARATUS)

Fig. 7

| DECOMPOSITION LEVEL | FOR POSITIVE COMPONENT AMOUNT | FOR NEGATIVE COMPONENT AMOUNT |
|---|---|---|
| 1 | 1.250162 | 0.119596 |
| 2 | 1.434876 | 0.278209 |
| 3 | 1.352112 | 0.490673 |
| 4 | 1.297688 | 0.616400 |
| 5 | 1.214609 | 0.791378 |
| 6 | 0.948354 | 1.094297 |

Fig. 12

| DECOMPOSITION LEVEL | FOR POSITIVE COMPONENT AMOUNT | FOR NEGATIVE COMPONENT AMOUNT |
|---|---|---|
| 1 | 0.799896333 | 8.361484 |
| 2 | 0.696924334 | 3.594420 |
| 3 | 0.739583703 | 2.038017 |
| 4 | 0.770601254 | 1.622323 |
| 5 | 0.823310218 | 1.263619 |
| 6 | 1.054458567 | 0.913829 |

DATA CONVERTING APPARATUS AND MEDIUM HAVING DATA CONVERTING PROGRAM

CROSS REFERENCE TO THE RELATED APPLICATIONS

This application is based upon Japanese Patent Application No. 2007-285282, filed on Nov. 1, 2007, the entire contents of which are incorporated herein by reference.

BACKGROUND

1. Field

The present application relates to a data converting apparatus and a data converting program applied to time estimation etc. of the sensitivity of human beings.

Furthermore, the present application relates to a data converting apparatus and a data converting program applied to temporal design etc. of a stimulus value to human beings.

2. Description of the Related Art

The perception of human beings has a characteristic of detecting the temporal alteration of a given stimulus value. However, the sensitivity of human beings at some time point is affected by not only the stimulus value given at the time but also the stimulus value which has been given before the time point concerned.

For example, just after a person enters a tunnel in the daytime, it is difficult for the person to see surroundings, however, the person is gradually getting a clear view (dark adaptation). Furthermore, just after a person goes out from a movie theater to the outside under brighter light condition, it is difficult for the person to see surroundings, however, the person is gradually getting a clear view (light adaptation).

Furthermore, there is an adaptation (custom) which is getting worse in sensitivity. For example, when a person continues to use a portable music player while the sound volume thereof is set to a large value, the person feels that the set sound volume is not loud enough. When a person continues to eat food having strongly salted food, the person feels that it is not salty enough. After a while, a person becomes insensitive to the smell of a house which the person smelled just after he/she came home. Furthermore, even when the display color of a television monitor is bluish, a viewer becomes insensitive to the bluish color once he/she starts watching it continuously.

Therefore, in recent years, it has been required to quantitatively estimate the temporal alteration of the sensitivity of human beings. For example, if the temporal alteration of the sensitivity of the eyes of human beings can be estimated, it would be possible for a designer to control the temporal alteration of the impression applied to users by performing temporal design of the luminance of illumination in facilities.

However, at present, although a method of quantitatively estimating the spatial distribution of lightness impression has been proposed (refer to Japanese Unexamined Patent Application Publication No. 2004-61150 or the like), any method of quantitatively estimating the temporal alteration of the lightness impression has not been proposed.

SUMMARY

It is a proposition of the application to provide a data converting apparatus and a data converting program that are suitable to quantitatively estimate, based on a temporal alteration of a stimulus value, a sensitivity which is brought to human beings by the temporal alteration concerned.

Furthermore, It is another proposition of the application to provide a data converting apparatus and a data converting program that are suitable to quantitatively estimate, based on a time alteration of a sensitivity, a stimulus value for giving the temporal alteration concerned to human beings.

A data converting apparatus includes a decomposing unit subjecting temporal alteration data of a stimulus value to wavelet decomposition to extract a plurality of time-frequency components contained in the temporal alteration data, a weighting unit weighting the plurality of the extracted time-frequency components with weighting coefficients which are predetermined based on a relationship between a temporal alteration of a stimulus value and a temporal alteration of a sensitivity of human beings to the stimulus value, and a synthesizing unit subjecting the plurality of the weighted time-frequency components to wavelet synthesis to estimate a sensitivity brought to human beings when the stimulus value is subjected to temporal alteration according to the temporal alteration data.

Furthermore, another data converting apparatus includes a decomposing unit subjecting temporal alteration data of a sensitivity of human beings to wavelet decomposition to extract a plurality of time-frequency components contained in the temporal alteration data, a weighting unit weighting the plurality of the extracted time-frequency components with weighting coefficients which are predetermined based on a relationship between a temporal alteration of a sensitivity of human beings and a temporal alteration of a stimulus value corresponding to the sensitivity, and a synthesizing unit subjecting the plurality of the weighted time-frequency components to wavelet synthesis to estimate a stimulus value to be given to human beings in order to subject the sensitivity to temporal alteration according to the temporal alteration data.

In either one of the data converting apparatus described above, the weighting unit may use weighting coefficients whose values are different between a case when component amounts of the plurality of the time-frequency components are positive and a case when the component amounts of the plurality of the time-frequency components are negative Furthermore, an orthogonal wavelet may be used for the wavelet decomposition and the wavelet synthesis.

A biorthogonal wavelet may be used for the wavelet decomposition and the wavelet synthesis.

The stimulus value may be a luminance of light applied to the eyes of human beings, and the sensitivity may be lightness resolution of the eyes of human beings.

Furthermore, a computer-readable medium having compute-executable instructions for performing a data converting program includes a decomposing step subjecting temporal alteration data of a stimulus value to wavelet decomposition to extract a plurality of time-frequency components contained in the temporal alteration data, a weighting step weighting the plurality of the extracted time-frequency components with weighting coefficients which are predetermined based on a relationship between a temporal alteration of a stimulus value and a temporal alteration of a sensitivity of human beings to the stimulus value, and a synthesizing step subjecting the plurality of the weighted time-frequency components to wavelet synthesis to estimate a sensitivity brought to human beings when the stimulus value is subjected to temporal alteration according to the temporal alteration data.

Furthermore, another computer-readable medium having compute-executable instructions for performing a data converting program includes a decomposing step subjecting temporal alteration data of a sensitivity of human beings to wavelet decomposition to extract a plurality of time-frequency components contained in the temporal alteration data, a weighting step weighting the plurality of the extracted time-frequency components with weighting coefficients which are predetermined based on a relationship between a temporal alteration of a sensitivity of human beings and a temporal alteration of a stimulus value corresponding to the sensitivity, and a synthesizing step subjecting the plurality of the weighted time-frequency components to wavelet synthesis to estimate a stimulus value to be given to human beings in order to subject the sensitivity to temporal alteration according to the temporal alteration data.

In either one of the data converting program described above, the weighting step may use weighting coefficients whose values are different between a case when component amounts of the plurality of the time-frequency components are positive and a case when the component amounts of the plurality of the time-frequency components are negative.

Furthermore, an orthogonal wavelet may be used for the wavelet decomposition and the wavelet synthesis.

A biorthogonal wavelet may be used for the wavelet decomposition and the wavelet synthesis.

The stimulus value may be a luminance of light applied to the eyes of human beings, and the sensitivity may be lightness resolution of the eyes of human beings.

BRIEF DESCRIPTION OF THE DRAWINGS

FIG. 7 is a diagram showing weighting coefficients according to the first embodiment.

FIG. 12 is a diagram showing weighting coefficients according to the second embodiment.

DETAILED DESCRIPTION OF THE EMBODIMENTS

[First Embodiment]

A first embodiment according to the present invention will be described hereunder. This embodiment relates to a data converting apparatus that converts temporal alteration data of luminance to temporal alteration data of sensitivity.

Figure 1:
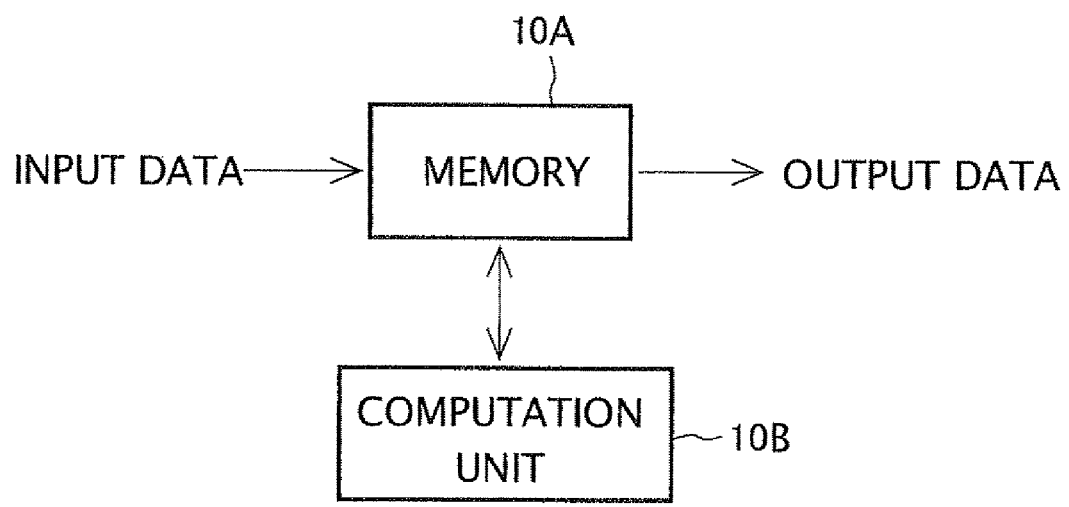
FIG. 1 is a block diagram showing the schematic construction of a data converting apparatus 10.

FIG. 1 is a block diagram showing the construction of the data converting apparatus 10. As shown in FIG. 1, the data converting apparatus 10 is a computer in which a data converting program is installed, and includes a memory 10A for storing input data as a processing target and output data as a processing result, and a computation unit 10B for executing computation processing of data conversion according to the operation of a flowchart (FIG. 2) described later. A recording medium (CD-ROM or the like) in which the data converting program is recorded may be used to install the data converting program into the computer. Alternatively, carrier waves (containing the data converting program) which can be downloaded through the Internet may be used.

Figure 2:
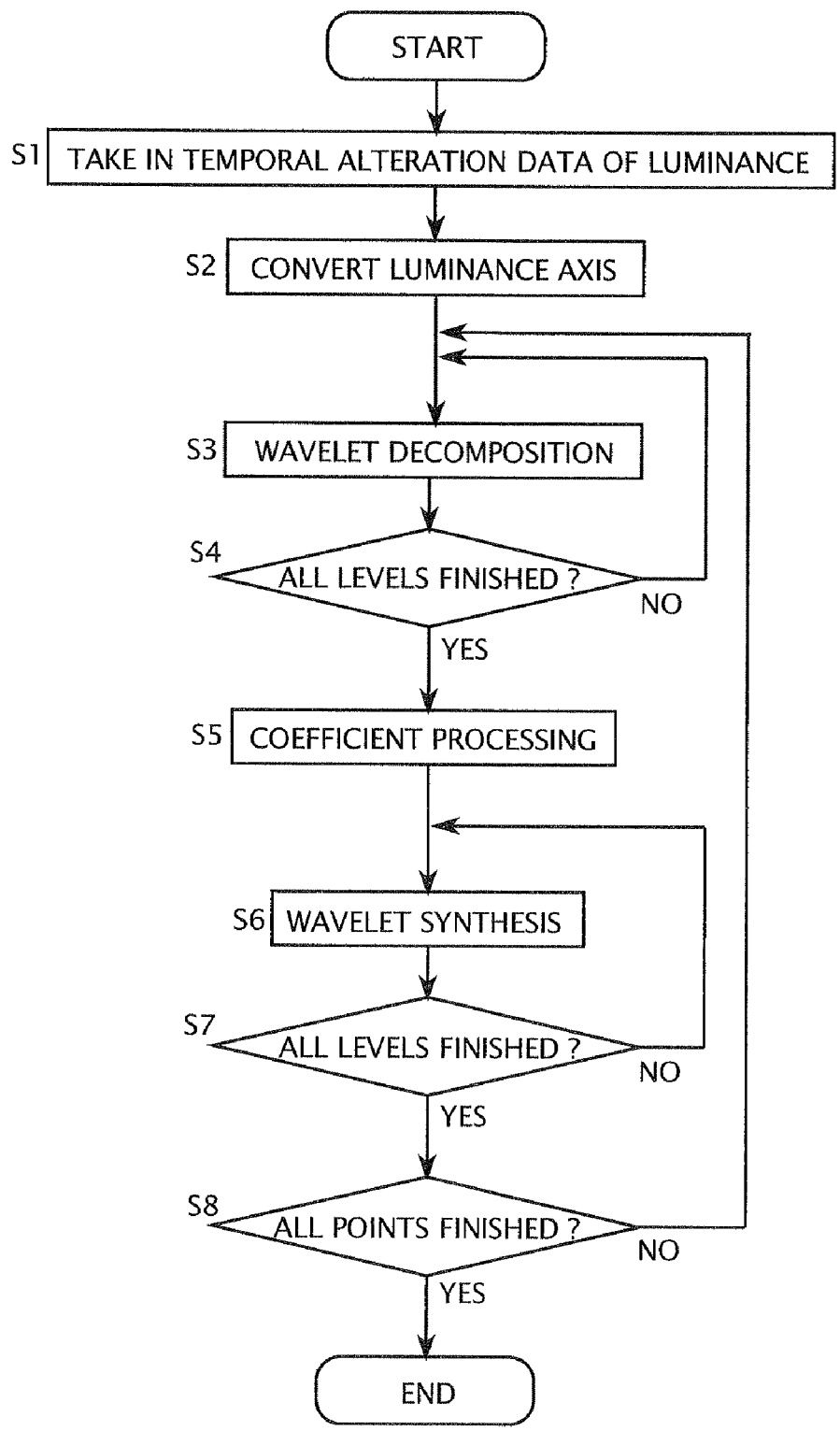
FIG. 2 is a flowchart showing the operation of conversion processing according to a first embodiment.

FIG. 2 is a flowchart showing the operation of the conversion processing of the computation unit 10B. The respective steps will be successively described hereunder.

Step S1: The computation unit 10B takes the input data into the memory 10A. The input data is temporal alteration data of luminance (FIG. 3), and for example, it is temporal alteration data of luminance of an illumination provided to some facilities. In this case, the unit of the luminance axis of the temporal alteration data is set to the real-number value of the luminance value, and the unit of the time axis is not set to lapsed time, but to retroactive time. The scale (unit) of the time axis is set to 0.025 second, and the data number is set to 113.

Step S2: The computation unit 10B converts the luminance axis of the temporal alteration data of luminance (FIG. 3) to the logarithmic value of the incremental threshold at the adaptation time. The incremental threshold value of luminance is defined as the minimum value of an incremental amount of luminance which is perceivable to human beings under the luminance concerned, and the incremental threshold at the adaptation time is defined as the incremental threshold of human beings who are adapted to the luminance concerned. The temporal alteration data after the conversion is as shown in FIG. 4.

Figure 5:
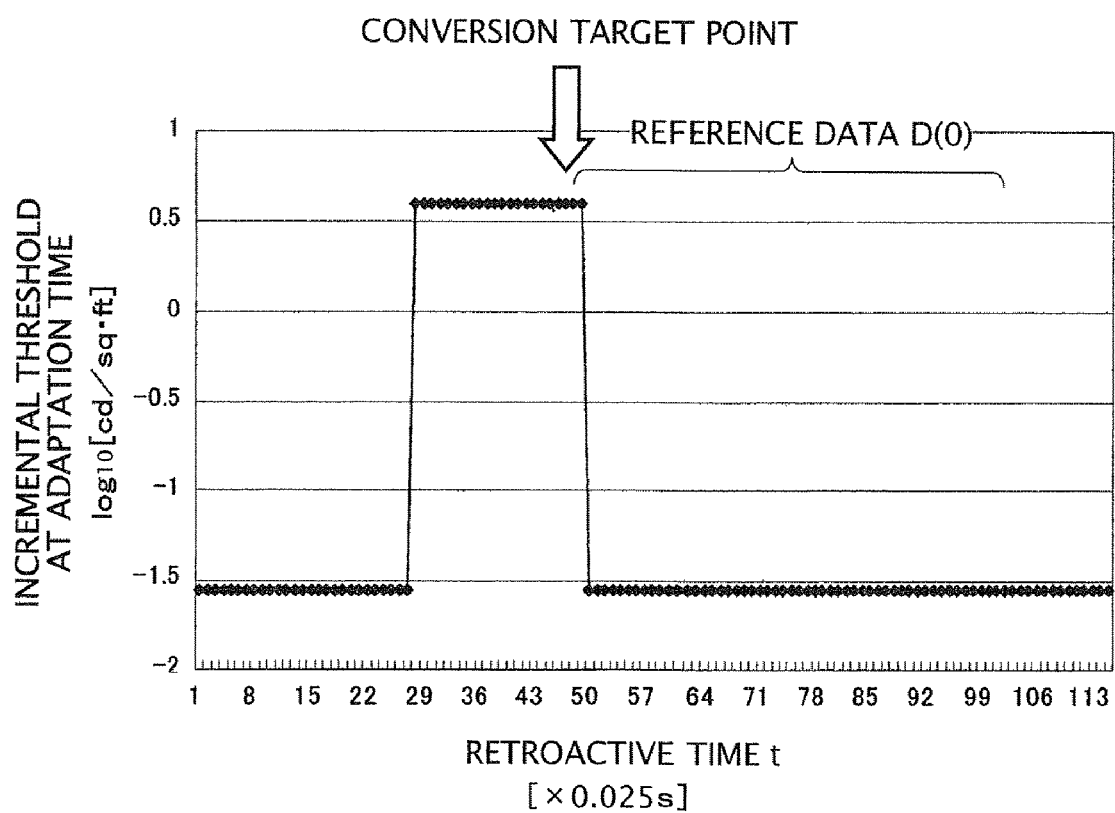
FIG. 5 is a diagram showing reference data.

In this step, as shown in FIG. 5, the computation unit 10B sets a point to be converted (conversion target point) on the time axis of the temporal alteration of luminance, and refers to a predetermined range of data at the past side of the conversion target point. In addition, this data will be referred to as "reference data D(0)". The data range of the reference data D(0) is set to be equal to or longer than the time which is required for the eyes of human beings to be adapted, and it is set to 1.25 seconds, for example. In this case, the scale of the time axis is set to 0.025 second, and thus when the data range is set to 1.25 seconds, the number of data of the reference data D(0) is equal to 50.

Figure 6:
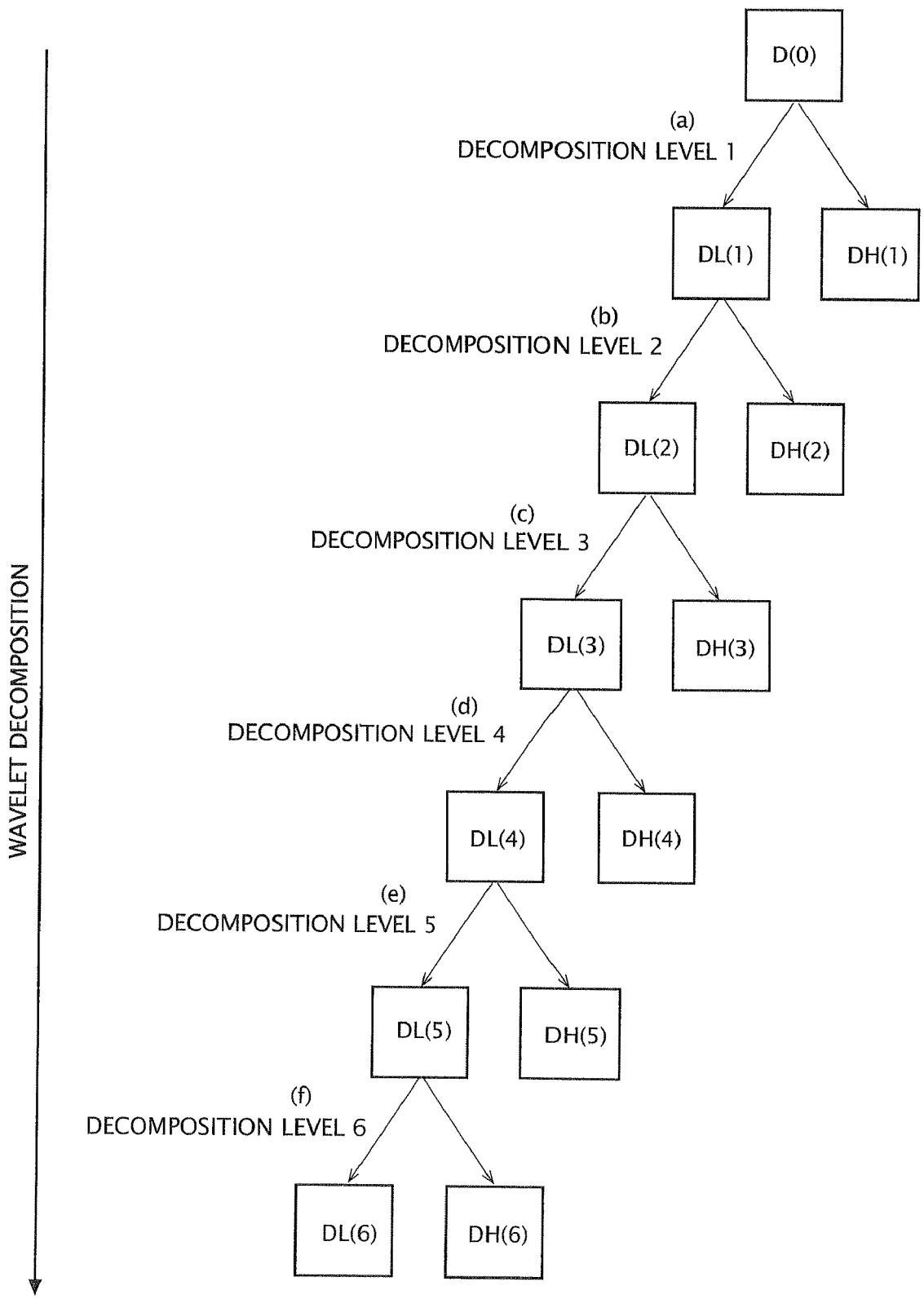
FIG. 6 is a diagram showing wavelet decomposition.

Step S3 (first): As shown in FIG. 6(a), the computation unit 10B subjects the reference data D(0) to the wavelet decomposition of decomposition level 1, thereby obtaining the component having the highest time frequency (the detail data DH(1) of decomposition level 1) contained in the reference data D(0) and the other components (approximate data DL(1) of the decomposition level 1). Among these, the detail data DH(1) is stored in the memory 10A. In addition, in this step, the mother wavelet of the wavelet decomposition is set to "Haar" represented by the following equation. Incidentally, "Haar" is one kind of orthogonal wavelet.

$$\Phi(t) = \begin{cases} 1 & (0 < t < 1) \\ 0 & (t < 0, 1 < t) \end{cases}$$

In step S4: The computation unit 10B determines whether the decomposition level of the wavelet decomposition reaches the final level. If the decomposition level does not reach the final level, the processing returns to the step S3, and if the decomposition level reaches the final level, the processing shifts to step S5. In addition, in this embodiment, the number of data of the reference data D(0) is equal to 50, and thus the final level of the wavelet decomposition is set to "6". Accordingly, the step S3 is repeated at six times.

Step S3 (second): As shown in FIG. 6(b), the computation unit 10B subjects the approximate data DL(1) of the decomposition level 1 to the wavelet decomposition of decomposition level 2, thereby obtaining the component having the highest time frequency (detail data DH(2) of the decomposition level 2) contained in the approximate data DL(1) and the other components (the approximate data DL(2) of the decomposition level 2). The detail data DH(2) is stored in the memory 10A.

Step S3 (third): As shown in FIG. 6(c), the computation unit 10B subjects the approximate data DL(2) of the decomposition level 2 to the wavelet decomposition of decomposition level 3, thereby obtaining the component having the highest time frequency (detail data DH(3) of the decomposition level 3) contained in the approximate data DL(2) and the other components (the approximate data DL(3) of the decomposition level 3). The detail data DH(3) is stored in the memory 10A.

Step S3 (fourth): As shown in FIG. 6(d), the computation unit 10B subjects the approximate data DL(3) of the decomposition level 3 to the wavelet decomposition of decomposition level 4, thereby obtaining the component having the highest time frequency (detail data DH(4) of the decomposition level 4) contained in the approximate data DL(3) and the other components (the approximate data DL(4) of the decomposition level 4). The detail data DH(4) is stored in the memory 10A.

Step S3 (fifth): As shown in FIG. 6(e), the computation unit 10B subjects the approximate data DL(4) of the decomposition level 4 to the wavelet decomposition of decomposition level 5, thereby obtaining the component having the highest time frequency (detail data DH(5) of the decomposition level 5) contained in the approximate data DL(4) and the other components (the approximate data DL(5) of the decomposition level 5). The detail data DH(5) is stored in the memory 10A.

Step S3 (sixth): As shown in FIG. 6(f), the computation unit 10B subjects the approximate data DL(5) of the decomposition level 5 to the wavelet decomposition of decomposition level 6, thereby obtaining the component having the highest time frequency (detail data DH(6) of the decomposition level 6) contained in the approximate data DL(5) and the other components (the approximate data DL(6) of the decomposition level 6). The detail data DH(6) and the approximate data DL(6) are stored in the memory 10A.

Step S5: The computation unit 10B subjects the detail data DH(1) to DH(6) and the approximate data DL(6) to coefficient processing to obtain detail data DH'(1) to DH'(6) and approximate data DL'(6), and stores the detail data DH'(1) to DH'(6) and the approximate data DL'(6) into the memory 10A. The coefficient processing in this step is represented by the following equations.

$$DH'(1) = \begin{cases} 1.250162 \times DH(1) & (DH(1) \geq 0) \\ 0.119596 \times DH(1) & (DH(1) < 0) \end{cases}$$

$$DH'(2) = \begin{cases} 1.434876 \times DH(2) & (DH(2) \geq 0) \\ 0.278209 \times DH(2) & (DH(2) < 0) \end{cases}$$

$$DH'(3) = \begin{cases} 1.352112 \times DH(3) & (DH(3) \geq 0) \\ 0.490673 \times DH(3) & (DH(3) < 0) \end{cases}$$

-continued $$DH'(4) = \begin{cases} 1.297688 \times DH(4) & (DH(4) \geq 0) \\ 0.616400 \times DH(4) & (DH(4) < 0) \end{cases}$$

$$DH'(5) = \begin{cases} 1.214609 \times DH(5) & (DH(5) \geq 0) \\ 0.791378 \times DH(5) & (DH(5) < 0) \end{cases}$$

$$DH'(6) = \begin{cases} 0.948354 \times DH(6) & (DH(6) \geq 0) \\ 1.094297 \times DH(6) & (DH(6) < 0) \end{cases}$$

$$DL'(6) = DL(6)$$

FIG. 7 shows a list of the weighting coefficients by which the respective detail data DH(1) to DH(6) in these equations are multiplied. As shown in FIG. 7, the values of the weight coefficients are prepared every detail data (every decomposition level). The value of the weighting coefficient of each decomposition level is equivalent to the degree of an impact which is applied to the sensitivity of human beings by each time frequency component contained in the temporal alteration data of luminance.

Furthermore, as shown in FIG. 7, the value of the weighting coefficient is different between the case where the component value of the detail data is positive and the case where the component value of the detail data is negative. This is caused by the difference in the degree of the impact applied to the eyes of human beings between the case where the luminance varies from the low side to the high side and the case where the luminance varies from the high side to the low side even when the time frequency component is the same.

Figure 15A:
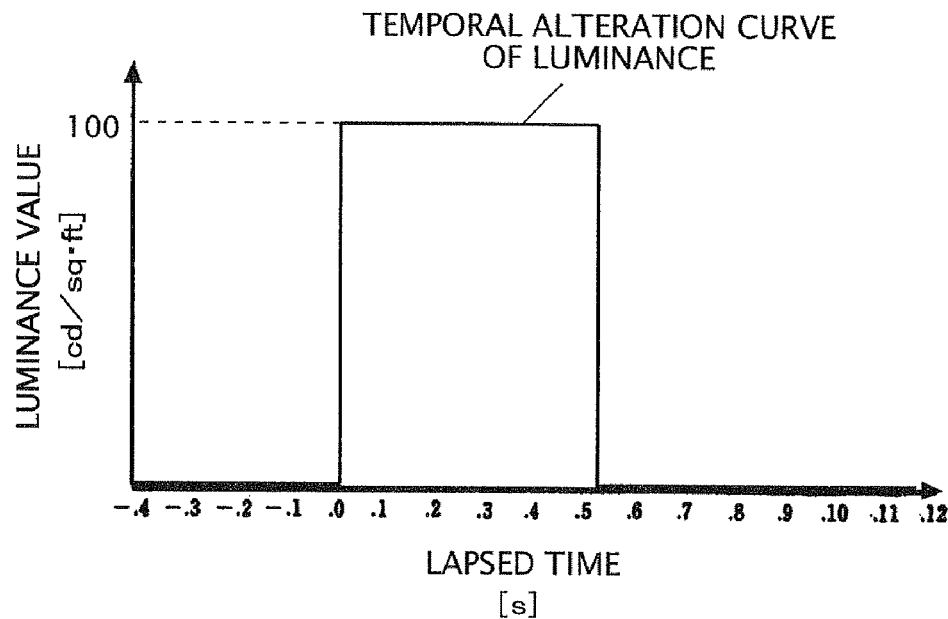
FIGS. 15A and 15B are diagrams showing an example of actual measurement data used in multi regression analysis.
Figure 15B:
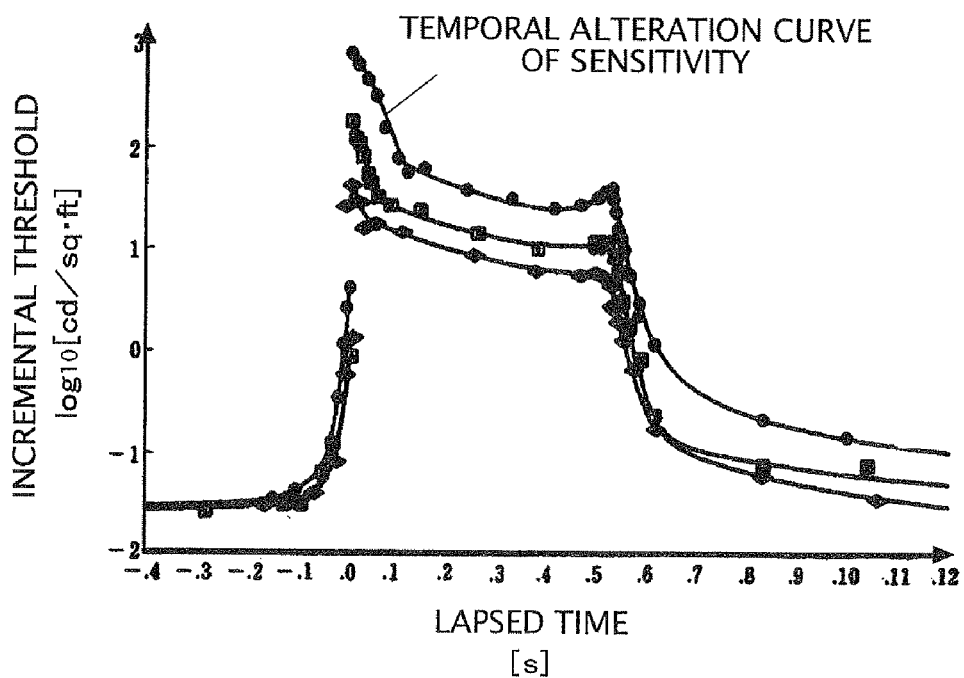

The weighting coefficients are predetermined based on the relationship between the temporal alteration of luminance (FIG. 15A) and the temporal alteration (FIG. 15B) exercised on the sensitivity by the temporal alteration of luminance. The method of determining the weighting coefficients will be described later.

Figure 8:
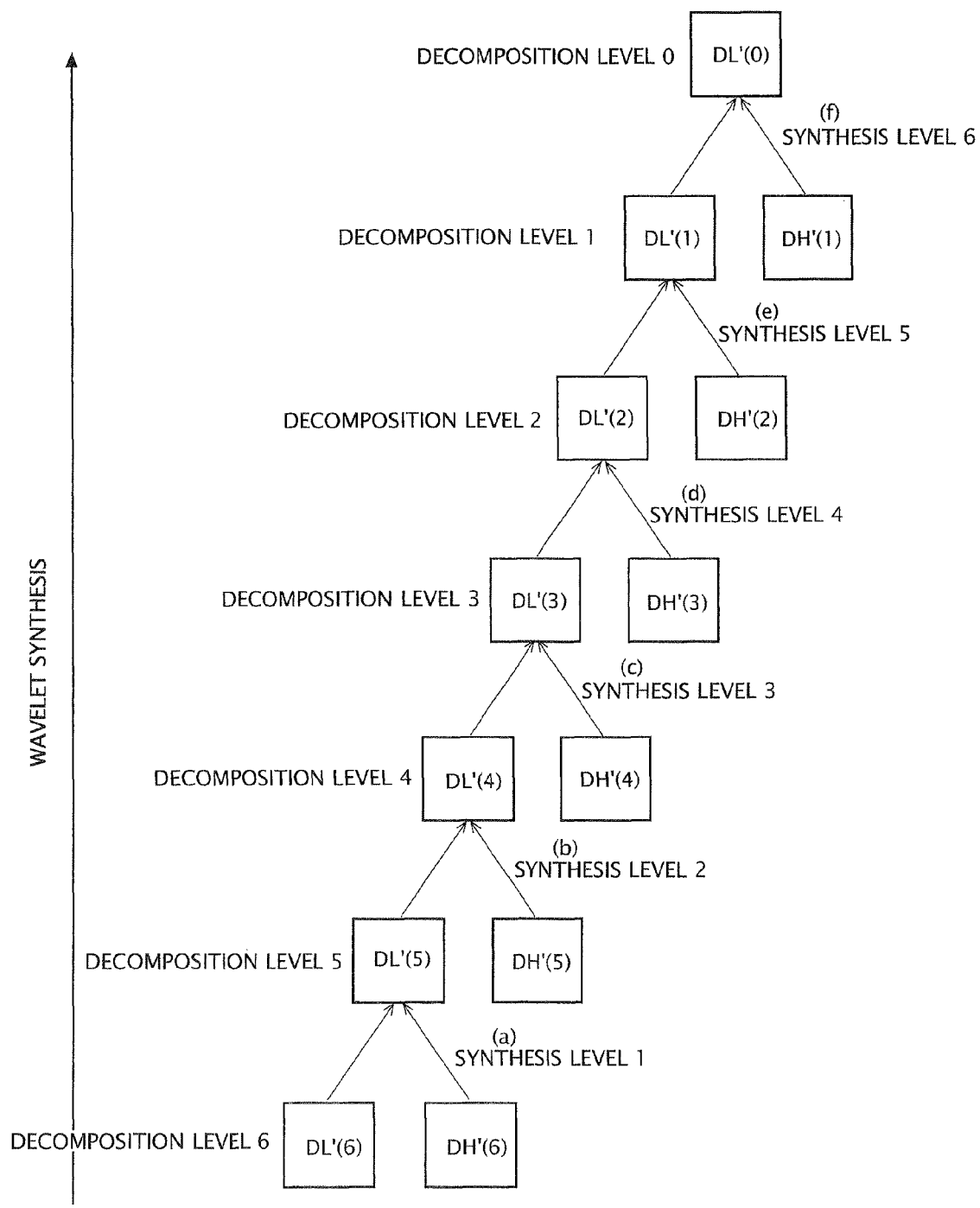
FIG. 8 is a diagram showing wavelet synthesis.

Step S6 (first): As shown in FIG. 8(a), the computation unit 10B subjects the detail data DH'(6) and the approximate data DL'(6) of the decomposition level 6 to the wavelet synthesis of synthetic level 1 to obtain the approximate data DL'(5) of decomposition level 5. The mother wavelet used in this step is set to the same wavelet (Haar) as used in step S3.

Step S7: The computation unit 10B determines whether the synthesis level reaches the final level or not. If the synthesis level does not reach the final level, the processing returns to step S6, and if the synthesis level reaches the final level, the processing goes to step 58. In the step S3 described above, the final level of the decomposition level is set to "6", and thus the final level of the synthesis level is also set to "6" in this step.

Step S6 (second): As shown in FIG. 8(b), the computation unit 10B subjects the detail data DH'(5) and the approximate data DL'(5) of the decomposition level 5 to the wavelet synthesis of synthetic level 2 to obtain the approximate data DL'(4) of decomposition level 4

Step S6 (third): As shown in FIG. 8(c), the computation unit 10B subjects the detail data DH'(4) and the approximate data DL'(4) of the decomposition level 4 to the wavelet synthesis of synthetic level 3 to obtain the approximate data DL'(3) of decomposition level 3.

Step S6 (fourth): As shown in FIG. 8(d), the computation unit 10B subjects the detail data DH'(3) and the approximate data DL'(3) of the decomposition level 3 to the wavelet synthesis of synthetic level 4 to obtain the approximate data DL'(2) of decomposition level 2.

Step S6 (fifth): As shown in FIG. 8(e), the computation unit 10B subjects the detail data DH'(2) and the approximate data DL'(2) of the decomposition level 2 to the wavelet synthesis of synthetic level 5 to obtain the approximate data DL'(1) of decomposition level 1.

Step S6 (sixth): As shown in FIG. 8(f), the computation unit 10B subjects the detail data DH'(1) and the approximate data DL'(1) of the decomposition level 1 to the wavelet synthesis of synthetic level 6 to obtain the approximate data DL'(O) of decomposition level 0. Then, the computation unit 10B stores the data corresponding to the conversion target point out of the approximate data DL'(0) as the sensitivity data of the conversion target point into the memory 10a.

Step S8: The computation unit 10B determines whether the conversion processing (steps S3 to S7) associated with all the conversion target points is finished or not. If it is not finished, the conversion target point is changed, and then the processing returns to step S3. If it is finished, the processing of the flow is finished.

Figure 9:
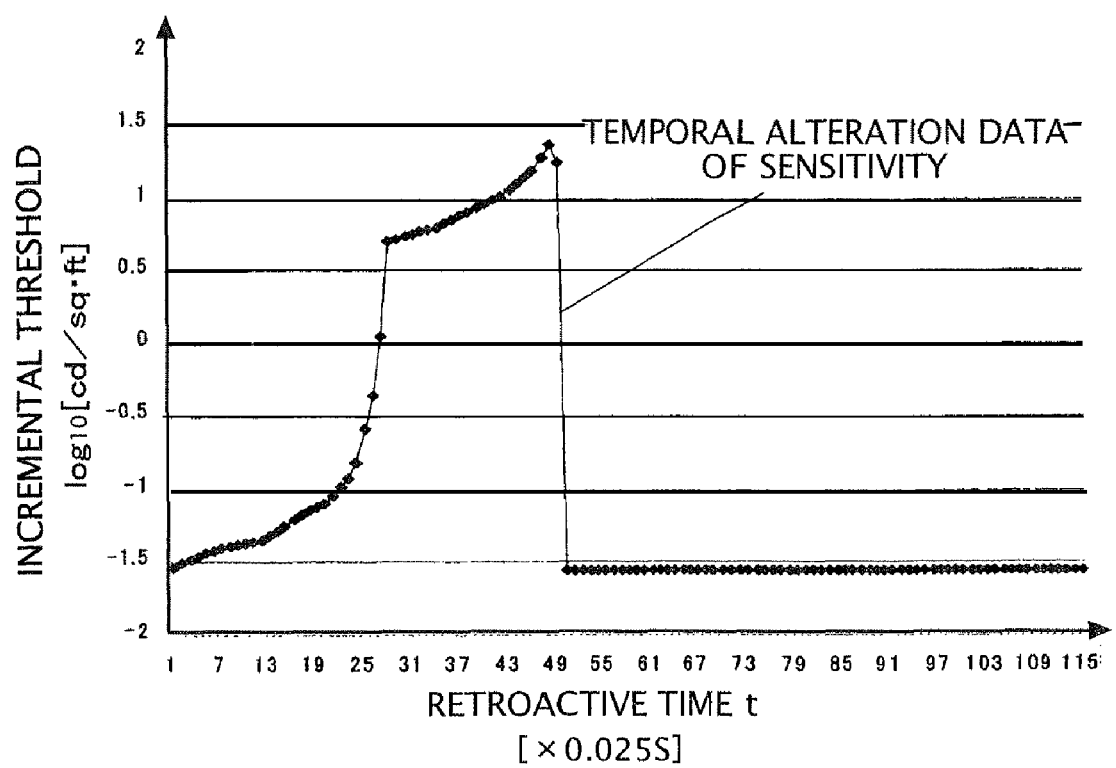
FIG. 9 is a diagram showing output data (temporal alteration data of sensitivity) according to the first embodiment.

As a result, the sensitivity data of all the conversion target points are stored in the memory 10A. When the sensitivity data of all the conversion target points are successively arranged in order of time, temporal alteration data of sensitivity as shown in FIG. 9 is obtained.

The sensitivity axis of the temporal alteration data is represented by the incremental threshold (=the minimum value of the luminance incremental amount which can be perceived by human beings). Therefore, it may be regarded that a more depressed portion of the curve shown in FIG. 9 is higher in sensitivity and a more swollen portion of the curve is lower in sensitivity.

As is apparent by comparing the curve based on this temporal alteration data of the sensitivity (FIG. 9) with the curve based on the temporal alteration of luminance (FIG. 3), the sensitivity is rapidly lowered just after illumination is turned on (t=50), and then the sensitivity is gradually restored. Furthermore, when illumination is turned off (t=25) again, the sensitivity is moderately enhanced.

Accordingly, according to the data converting apparatus 10 of this embodiment, the temporal alteration of sensitivity which is brought to human beings by the luminance temporal alteration of illumination in facilities can be quantitatively estimated based on the luminance temporal alteration of illumination in facilities.

The data converting apparatus 10 according to this embodiment uses the orthogonal wavelet for the wavelet decomposition and the wavelet synthesis, and thus the conversion error from the temporal alteration data of luminance to the temporal alteration data of sensitivity is very small.

Figure 3:
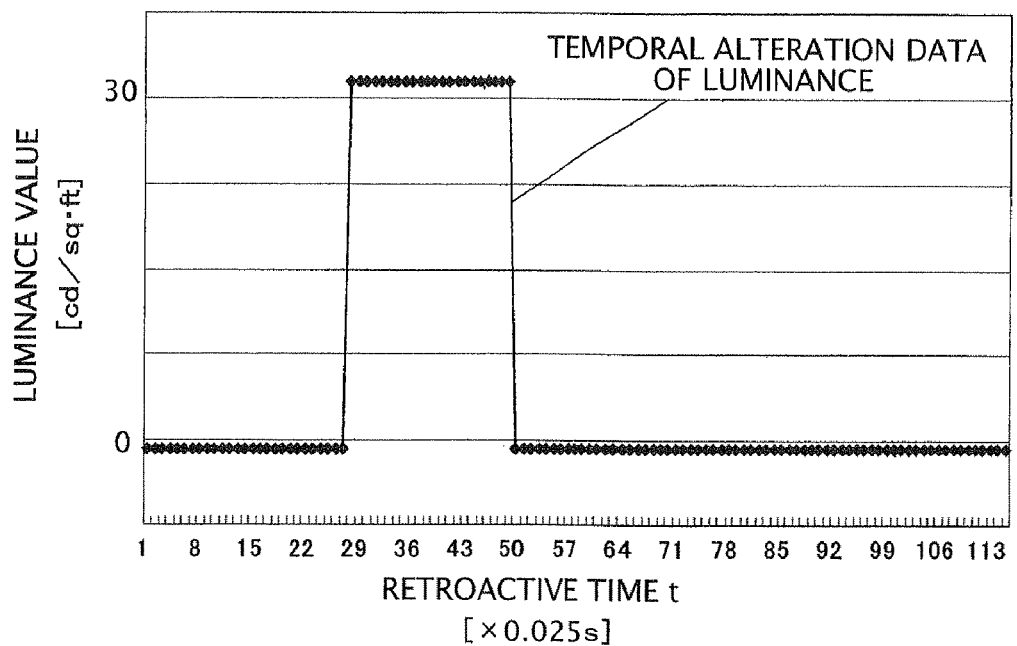
FIG. 3 is a diagram showing input data (temporal alteration data of luminance) according to the first embodiment.
Figure 4:
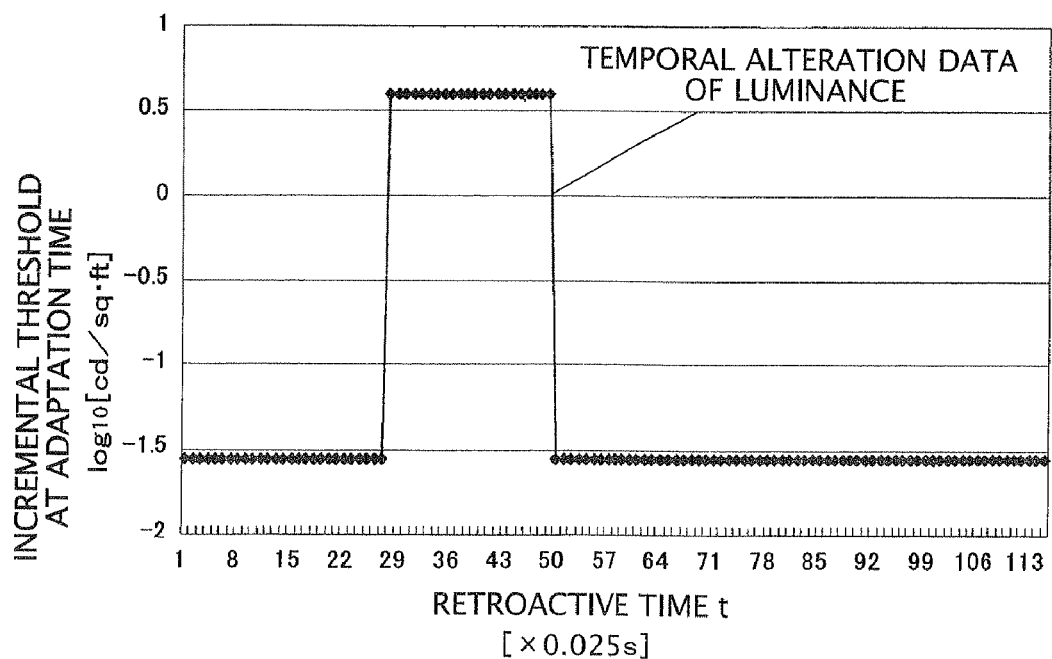
FIG. 4 is a diagram showing temporal alteration data after conversion of a luminance axis.

Accordingly, if the sensitivity temporal alteration data (FIG. 9) obtained in this embodiment is inversely converted by using the same orthogonal wavelet, it can be restored to the original luminance temporal alteration data (FIG. 3). Thus, if the conversion method of this embodiment is applied, the bidirectional conversion between the luminance temporal alteration data and the sensitivity temporal alteration data can be performed (the details of the inverse conversion will be described in detail with respect to a second embodiment).

[Second Embodiment]

A second embodiment according to the present invention will be described. This embodiment relates to a data converting apparatus for converting temporal alteration data of sensitivity to temporal alteration data of luminance. The construction of the data converting apparatus according to this embodiment is the same as that of the first embodiment (FIG. 1), and only the operation is different between these embodiments. Accordingly, only the operation will be described.

Figure 10:
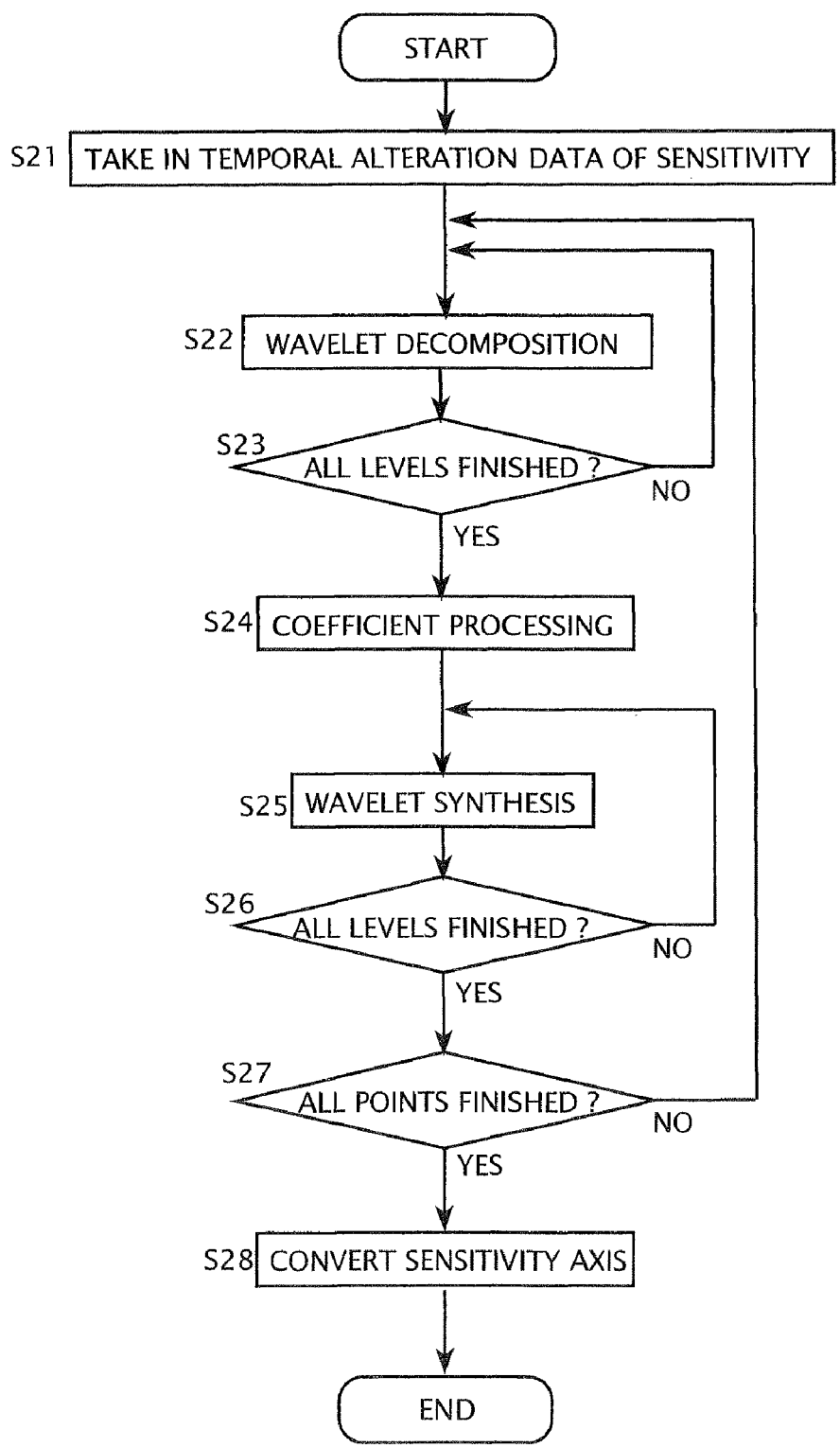
FIG. 10 is a flowchart showing the operation of conversion processing according to a second embodiment.

FIG. 10 is a flowchart showing the operation of the conversion processing of the computation unit 10B. The respective steps will be successively described hereunder.

Figure 11:
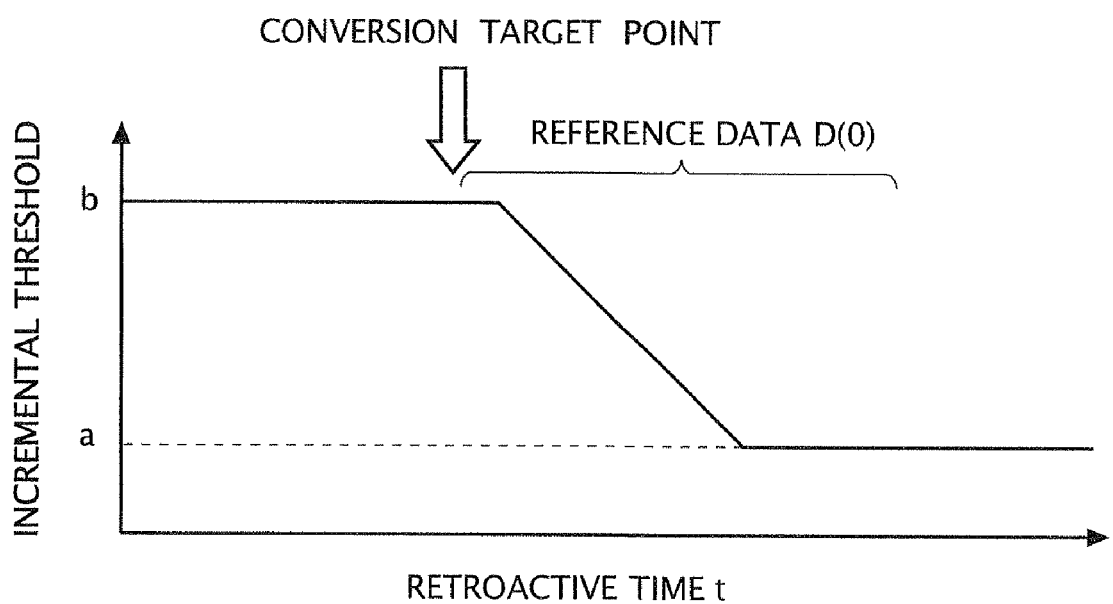
FIG. 11 is a conceptual diagram showing input data (temporal alteration data of sensitivity) according to the second embodiment.

Step S21: The computation unit 10B takes input data into the memory 10A. The input data is temporal alteration data of sensitivity (FIG. 11), and it is temporal alteration data of sensitivity which is intended to be given to users by an illumination designer of certain facilities. In this case, the unit of the sensitivity axis of the temporal alteration data is set to the logarithmic value of the incremental threshold of the luminance value, and the unit of the time axis is not set to the lapsed time, but to the retroactive time. Furthermore, the scale (unit) of the time axis is set to 0.025 second, and the number of data is set to 113.

In this step, the computation unit 10B settles a conversion target point on the time axis of the temporal alteration data of sensitivity (FIG. 11), and refers to a predetermined range of data at the past side of the conversion target point. This data will be referred to as "reference data D(0)". In addition, the data range of the reference data D(0) is set to be equal to or longer than the time which is required for the sensitivity of the eyes of human beings to be adapted, and it is set to 1.25 seconds, for example. In this case, the scale of the time axis is set to 0.025 second, and thus when the data range is set to 1.25 seconds, the number of data of the reference data D(0) is equal to 50.

Step S22: The computation unit 10B executes the same wavelet decomposition as the step S3 of the first embodiment (see FIG. 6). In this step, the mother wavelet of the wavelet decomposition is set to Haar.

Step S23: The computation unit 10B determines whether the decomposition level of the wavelet composition reaches the final level. If it does not reach the final level, the processing returns to the step S22, and if it reaches the final level, the processing shifts to step S24. In this embodiment, the number of data of the reference data D(0) is equal to 50, and thus the final level of the wavelet decomposition is set to "6". Accordingly, the step S22 is repeated at six times. As a result of the repetition, detail data DH(1) to DH(6) of decomposition levels 1 to 6 and approximate data DL(6) of decomposition level 6 are obtained, and stored in the memory 10A.

Step S24: As in the case of the step S5 of the first embodiment, the computation unit 10B subjects the detail data DH(1) to DH(6) and the approximate data DL(6) to the coefficient processing to obtain detail data DH'(1) to DH'(6) and approximate data DL'(6), and stores the detail data DH'(1) to DH'(6) and the approximate data DL'(6) into the memory 10A. However, the coefficient processing of this step is different from the coefficient processing of the first embodiment, and represented by the following equations.

$$DH'(1) = \begin{cases} 0.799896333 \times DH(1) & (DH(1) \geq 0) \\ 8.361484 \times DH(1) & (DH(1) < 0) \end{cases}$$

$$DH'(2) = \begin{cases} 0.696924334 \times DH(2) & (DH(2) \geq 0) \\ 3.594420 \times DH(2) & (DH(2) < 0) \end{cases}$$

$$DH'(3) = \begin{cases} 0.739583703 \times DH(3) & (DH(3) \geq 0) \\ 2.038017 \times DH(3) & (DH(3) < 0) \end{cases}$$

$$DH'(4) = \begin{cases} 0.770601254 \times DH(4) & (DH(4) \geq 0) \\ 1.622323 \times DH(4) & (DH(4) < 0) \end{cases}$$

$$DH'(5) = \begin{cases} 0.823310218 \times DH(5) & (DH(5) \geq 0) \\ 1.263619 \times DH(5) & (DH(5) < 0) \end{cases}$$

-continued $$DH'(6) = \begin{cases} 1.054458567 \times DH(6) & (DH(6) \geq 0) \\ 0.913829 \times DH(6) & (DH(6) < 0) \end{cases}$$

$$DL'(6) = DL(6)$$

FIG. 12 shows a list of weighting coefficients by which the respective detail data DH(1) to DH(6) in these equations are multiplied. As shown in FIG. 12, the values of the weight coefficients are prepared every detail data (every decomposition level). The conversion processing of this embodiment corresponds to the inverse conversion of the conversion processing of the first embodiment, and thus as is apparent from the comparison between FIG. 12 and FIG. 7, the values of the weighting coefficients of this embodiment correspond to the reciprocal numbers of the weighting coefficients of the first embodiment.

The weighting coefficients shown in FIG. 12 are predetermined according to the relationship between temporal alteration of luminance (FIG. 15A) and temporal alteration (FIG. 15B) exercised on the sensitivity by the temporal alteration of luminance. This determining method will be described later.

Step S25: The computation unit 10B executes the same wavelet synthesis (see FIG. 8) as the step S6 of the first embodiment. The mother wavelet used in this step is the same wavelet (Haar) as used in step S22.

Step S26: The computation unit 10B determines whether the synthesis level reaches the final level or not. If it does not reach the final level, the processing returns to step S25. If it reaches the final level, the processing shifts to step S27. In the step S22 described above, the final level of the decomposition level is set to "6", and thus the final level of the synthesis level is also set to "6" in this step. Accordingly, the approximate data DL'(0) of the decomposition level 0 is determined, and the data corresponding to the conversion target point out of the approximate data DL'(0) is stored as the luminance data of the conversion target point in the memory 10A.

Figure 13:
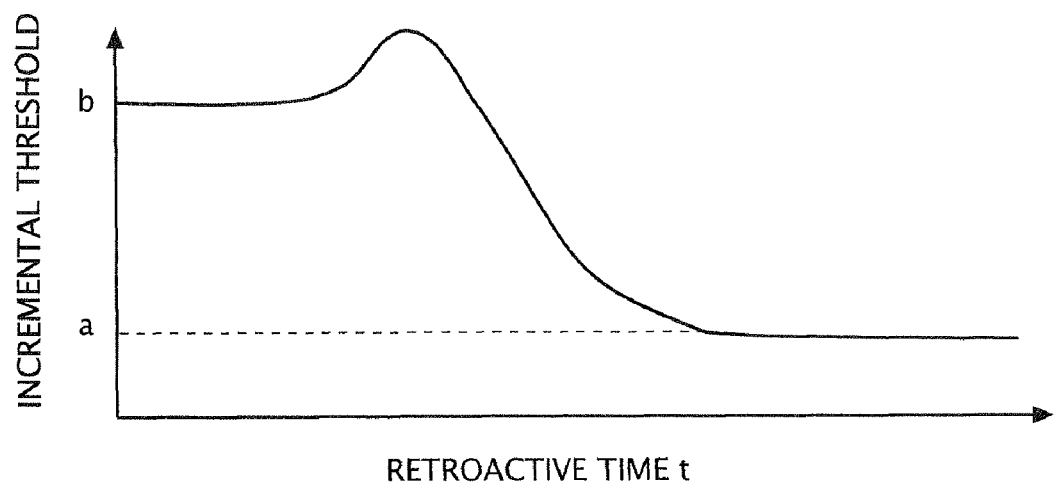
FIG. 13 is a conceptual diagram showing the temporal alteration data of luminance.

Step S27: The computation unit 10B determines whether the conversion processing on all the conversion target points (steps S22 to S26) is finished. If the conversion processing is not finished, the conversion target point is changed and then the processing returns to the step S22. If the conversion processing is finished, the processing shifts to step S28. As a result, the luminance data of all the conversion target points are stored in the memory 10A. When the luminance data of all the conversion target points are arranged in order of time, the temporal alteration data of luminance as shown in FIG. 13 are obtained (FIG. 13 is a conceptual diagram), for example. However, the luminance axis of the temporal alteration data is represented by the logarithmic value of the incremental threshold (the minimum value of the incremental amount which human beings can perceive) at the adaptation time.

Figure 14:
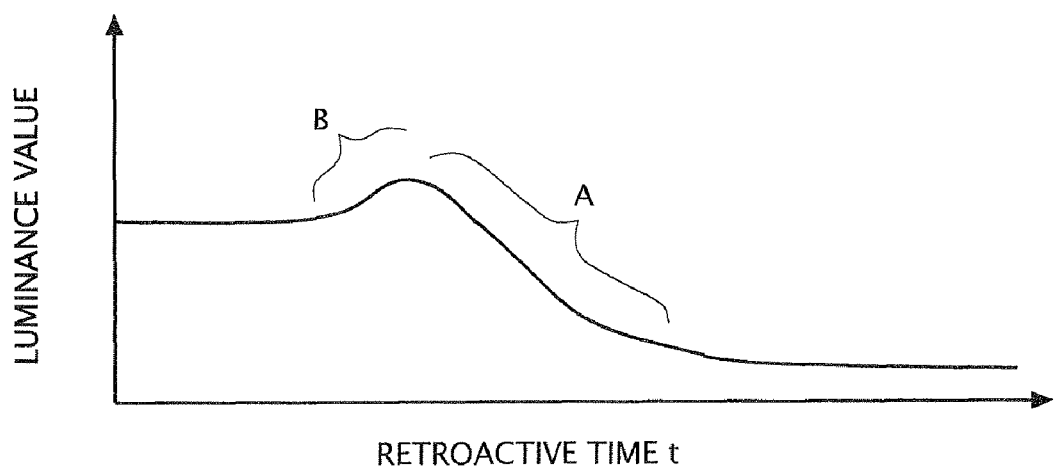
FIG. 14 is a conceptual diagram showing output data (temporal alteration data of luminance) according to the second embodiment.

Step S28: The computation unit 10B converts the unit of the luminance axis of the temporal alteration data of luminance (FIG. 13) to the luminance value, stores the converted temporal alteration data (FIG. 14) into the memory 10A, and then finishes the flow (FIG. 14 is a conceptual diagram). This conversion corresponds to the inverse conversion of the conversion in the step S2 of the first embodiment.

As is apparent from the comparison between a curve based on the obtained temporal alteration data (FIG. 14) and a curve based on the temporal alteration data of sensitivity (FIG. 11), when the sensitivity is linearly varied from a high sensitivity a to a low sensitivity b, the luminance may be increased to a required or higher luminance while moderately increased (FIG. 14(A)), and then reduced to a required luminance (FIG. 14(B)).

Accordingly, according to the data converting apparatus 10 of this embodiment, the luminance temporal alteration of illumination which brings human beings the temporal alteration of the sensitivity of eyes can be quantitatively estimated from the temporal alteration of the sensitivity of the eyes.

[Method of Determining Weighting Coefficients]

The method of determining the weighting coefficients of the first embodiment (FIG. 7) will be described.

The determination of the weighting coefficients (FIG. 7) of the first embodiment is executed by the multi regression analysis based on measured data. The measured data being used contain the measured data of the temporal alteration of luminance (FIG. 15A) and the measured data of the temporal alteration (FIG. 15B) exercised on the sensitivity of human beings by the luminance temporal alteration. It is desired that these measured data contain time frequency components at the maximum level. Accordingly, the curve of the measured data (FIG. 15A) is set to a pulse shape, for example.

Furthermore, the scale of the time axis (time resolution) of the measured data (FIGS. 15A and 15B) is set to the same as the input data of the first embodiment. The type of the mother wavelet assumed in the multi regression analysis is set to the same type of the mother wavelet used in the first embodiment (in this case, Haar).

However, it is desired that the data range of the reference data assumed in the multi regression analysis is sufficiently broader than the data range of the reference data settled in the first embodiment in order to enhance the determination precision of the weighting coefficients. Generally speaking, since the perfect dark adaptation needs several tens minutes, the data range is desired to be set to several tens minutes or more. Furthermore, since the data range of the reference data is broader, the final decomposition level (the final synthesis level) assumed in the multi regression analysis is set to be higher than the final decomposition level (the final synthesis level) of the first embodiment by the amount of the increase in the data range of the reference data assumed in the multi regression analysis.

If the multi regression analysis is executed under the above condition, the weighting coefficients of the first embodiment (FIG. 7) could be calculated with high precision. Furthermore, the weighting coefficients of the second embodiments (FIG. 12) can be simply calculated by merely calculating the reciprocal numbers of the weighting coefficients of the first embodiment (FIG. 7).

[Modification]

In the above embodiments, Haar is used as the mother wavelet of the wavelet decomposition and the wavelet synthesis. However, another orthogonal wavelet or biorthogonal wavelet may be used. However, when the type of the mother wavelet is varied, the values of the weighting coefficients described above (FIGS. 7, 12) are varied.

Furthermore, in the above embodiments, the data number of the reference data is set to 50, and thus the final decomposition level (the final synthesis level) is set to "6". However, the combination of the data number of the reference data and the final decomposition level (the final synthesis level) may be set to another combination. Incidentally, as the number of data increases, that is, as the final decomposition level (the final synthesis level) is higher, the number of weighting coefficients to be used increases.

In the above second embodiment, the combination of the data number of the reference data and the final decomposition level (the final synthesis level) is identical to that of the first embodiment, however, they may be different from each other.

Furthermore, in the second embodiment, the time resolution of input data is identical to that of the first embodiment, however, they may be different from each other. However, in this case, since the weighting coefficients of the second embodiment are not equal to the reciprocal numbers of the weighting coefficients of the first embodiment, it is required to determine the weight coefficients of the second embodiment by a multi regression analysis different from the multi regression analysis of the first embodiment.

Still furthermore, in the second embodiment, the type of the mother wavelet is the same as the first embodiment, however, they may be different from each other. However, in this case, since the weighting coefficients of the second embodiment are not equal to the reciprocal numbers of the weighting coefficients of the first embodiment, it is required to determine the weighting coefficients of the second embodiment by a multi regression analysis different from the multi regression analysis of the first embodiment.

Still furthermore, in the above embodiments, all the detail data after the coefficient processing are used for the wavelet synthesis. However, a part of the detail data after the coefficient processing (for example, the detail data whose component amounts are small) may be neglected, and only the other part may be used. Accordingly, the calculation can be simplified. However, the conversion can be performed with more accuracy by using all the detail data after the coefficient processing for the wavelet synthesis.

Still furthermore, in the above first embodiment, the luminance axis is converted to the logarithmic value before the temporal alteration data of luminance is converted to the temporal alteration of sensitivity. However, other than the logarithmic conversion, power Function such as one-third power or the like may be used. Power Function may be set in conformity with the representation of the uniform perception space.

Still furthermore, in the second embodiment, the ordinate axis of the temporal alteration data of sensitivity is set to the logarithmic value, the temporal alteration data of sensitivity is converted to the temporal alteration data of luminance, and then the luminance axis of the luminance temporal alteration data concerned is converted to the real number value. However, other than the logarithmic conversion, Power Function such as one-third power or the like may be used. Power Function may be set in conformity with the representation of the uniform perception space.

The data converting program (first data converting program) for converting the temporal alteration data of luminance to the temporal alteration data of sensitivity has been described with respect to the first embodiment, and the data converting program (second data converting program) for converting the temporal alteration data of sensitivity to the temporal alteration data of luminance has been described with respect to the second embodiment. However, a data converting program with which bidirectional conversion between the luminance temporal alteration data and the sensitivity temporal alteration data can be performed may be implemented.

Furthermore, when the speed of the conversion processing described above is increased, the data converting apparatus 10 can be operated as follows. That is, the data converting apparatus 10 simultaneously displays a curve representing luminance temporal alteration and a curve representing sensitivity temporal alteration curve on a monitor. When one of the curves is arbitrarily deformed by the user under this state, the data converting apparatus 10 deforms the other curve on a real-time basis. Such an operation program may be installed into CG creating software or the like used in illumination design When the CG creation software is used, the designer can design the temporal alteration of the output of lighting equipment at his/her discretion.

In the above embodiments, the computer in which the data converting program is installed is set as the data converting apparatus 10. However, the data converting apparatus 10 may be designed in the form of a chip by dedicated hardware (LSI). The chip design makes it possible to perform the above conversion processing at high speed.

Furthermore, the data conversion described with respect to the above embodiments is applied between visual perception and luminance. However, it may be applied between specific color sensitivity and specific chromaticity, between specific sense of taste and specific flavor component amount, between thermal sense and temperature and between specific olfactory sense and specific smelly component amount. Some application examples are provided.

(1) Visual Sense (a) The luminance of illumination set at each position of an approach in an art gallery is designed so that a user is brought with necessary sensitivity just after the user enters an exhibition hall.

(b) A user is made to preferentially see art objects under bright illumination, dark portions are provided between the art objects, and the frequency, luminance, etc. of the dark portions are properly designed, whereby the adaptation of the user is completed before the user reaches art objects under dark illumination.

(c) A temporal alteration pattern of colored light which a user does not feel odd is designed. Alternatively, a temporal alteration pattern of colored light to which attention is easily attracted is designed.

(d) A situation under which an accident occurs easily under a vehicle driving condition, under a sporting condition at night or the like is estimated.

(e) Illumination is temporally designed to prevent occurrence of an accident under a vehicle driving condition, under a sporting condition at night or the like.

(2) Acoustic Sense (a) An accident or noise is prevented without degrading availability by lowering the sound volume of a portable audio in a temporal alteration patter which the user does not perceive.

(3) Sense of Taste (a) An aspect that a person cannot satisfy bland food if the person frequently eats strongly salted food is quantitatively estimated.

(b) A dietary formula is established so that lifestyle-related diseases can be prevented without making users feel dissatisfied with the dietary formula.

(4) Thermal Sense (a) Under the automatic temperature control of an air conditioner, the temperature is increased in the summer in a temporal alteration patter which hardly makes users have uncomfortable feeling, and reduced in the winter in a temporal alteration pattern which hardly makes users have uncomfortable feeling to save energy.

(5) Sense of Smell (a) An aspect that a person is losing sense of unpleasant smell of his/her house is quantitatively estimated.

(b) An alteration pattern of smell to which attention is easily attracted is estimated.

(c) Environmental considerations are taken to keep the sense of smell of drug-sniffing dogs in the best condition.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A data converting apparatus, comprising:
    a decomposing unit subjecting temporal alteration data of a stimulus value to wavelet decomposition to extract a plurality of time-frequency components contained in the temporal alteration data;
    a weighting unit weighting the plurality of the extracted time-frequency components with weighting coefficients which are predetermined based on a relationship between a temporal alteration of a stimulus value and a temporal alteration of a sensitivity of human beings to the stimulus value; and
    a synthesizing unit subjecting the plurality of the weighted time-frequency components to wavelet synthesis to estimate a sensitivity brought to human beings when the stimulus value is subjected to temporal alteration according to the temporal alteration data.

2. A data converting apparatus, comprising:
    a decomposing unit subjecting temporal alteration data of a sensitivity of human beings to wavelet decomposition to extract a plurality of time-frequency components contained in the temporal alteration data;
    a weighting unit weighting the plurality of the extracted time-frequency components with weighting coefficients which are predetermined based on a relationship between a temporal alteration of a sensitivity of human beings and a temporal alteration of a stimulus value corresponding to the sensitivity; and
    a synthesizing unit subjecting the plurality of the weighted time-frequency components to wavelet synthesis to estimate a stimulus value to be given to human beings in order to subject the sensitivity to temporal alteration according to the temporal alteration data.

3. The data converting apparatus according to claim 1, wherein
    the weighting unit uses weighting coefficients whose values are different between a case when component amounts of the plurality of the time-frequency components are positive and a case when the component amounts of the plurality of the time-frequency components are negative.

4. The data converting apparatus according to claim 2, wherein
    the weighting unit uses weighting coefficients whose values are different between a case when component amounts of the plurality of the time-frequency components are positive and a case when the component amounts of the plurality of the time-frequency components are negative.

5. The data converting apparatus according to claim 1, wherein
    an orthogonal wavelet is used for the wavelet decomposition and the wavelet synthesis.

6. The data converting apparatus according to claim 2, wherein
    an orthogonal wavelet is used for the wavelet decomposition and the wavelet synthesis.

7. The data converting apparatus according to claim 1, wherein
    a biorthogonal wavelet is used for the wavelet decomposition and the wavelet synthesis.

8. The data converting apparatus according to claim 2, wherein
    a biorthogonal wavelet is used for the wavelet decomposition and the wavelet synthesis.

9. The data converting apparatus according to claim 1, wherein:
    the stimulus value is a luminance of light applied to the eyes of human beings; and
    the sensitivity is lightness resolution of the eyes of human beings.

10. The data converting apparatus according to claim 2, wherein:
    the stimulus value is a luminance of light applied to the eyes of human beings; and
    the sensitivity is lightness resolution of the eyes of human beings.

11. A computer-readable recording medium having a data converting program causing a computer to execute:
    a decomposing step subjecting temporal alteration data of a stimulus value to wavelet decomposition to extract a plurality of time-frequency components contained in the temporal alteration data;
    a weighting step weighting the plurality of the extracted time-frequency components with weighting coefficients which are predetermined based on a relationship between a temporal alteration of a stimulus value and a temporal alteration of a sensitivity of human beings to the stimulus value; and
    a synthesizing step subjecting the plurality of the weighted time-frequency components to wavelet synthesis to estimate a sensitivity brought to human beings when the stimulus value is subjected to temporal alteration according to the temporal alteration data.

12. A computer-readable recording medium having a data converting program causing a computer to execute:
    a decomposing step subjecting temporal alteration data of a sensitivity of human beings to wavelet decomposition to extract a plurality of time-frequency components contained in the temporal alteration data;
    a weighting step weighting the plurality of the extracted time-frequency components with weighting coefficients which are predetermined based on a relationship between a temporal alteration of a sensitivity of human beings and a temporal alteration of a stimulus value corresponding to the sensitivity; and
    a synthesizing step subjecting the plurality of the weighted time-frequency components to wavelet synthesis to estimate a stimulus value to be given to human beings in order to subject the sensitivity to temporal alteration according to the temporal alteration data.

13. The computer-readable recording medium having the data converting program according to claim 11, wherein
    the weighting step uses weighting coefficients whose values are different between a case when component amounts of the plurality of the time-frequency components are positive and a case when the component amounts of the plurality of the time-frequency components are negative.

14. The computer-readable recording medium having the data converting program according to claim 12, wherein
    the weighting step uses weighting coefficients whose values are different between a case when component amounts of the plurality of the time-frequency components are positive and a case when the component amounts of the plurality of the time-frequency components are negative.

15. The computer-readable recording medium having the data converting program according to claim 11, wherein
an orthogonal wavelet is used for the wavelet decomposition and the wavelet synthesis.

16. The computer-readable recording medium having the data converting program according to claim 12, wherein
an orthogonal wavelet is used for the wavelet decomposition and the wavelet synthesis.

17. The computer-readable recording medium having the data converting program according to claim 11, wherein
a biorthogonal wavelet is used for the wavelet decomposition and the wavelet synthesis.

18. The computer-readable recording medium having the data converting program according to claim 12, wherein
a biorthogonal wavelet is used for the wavelet decomposition and the wavelet synthesis.

19. The computer-readable recording medium having the data converting program according to claim 11, wherein
the stimulus value is a luminance of light applied to the eyes of human beings, and
the sensitivity is lightness resolution of the eyes of human beings.

20. The computer-readable recording medium having the data converting program according to claim 12, wherein
the stimulus value is a luminance of light applied to the eyes of human beings, and
the sensitivity is lightness resolution of the eyes of human beings.

* * * * *